United States Patent
Park et al.

(10) Patent No.: US 8,848,580 B2
(45) Date of Patent: Sep. 30, 2014

(54) RESOURCE ALLOCATION METHOD FOR BACKHAUL LINK AND ACCESS LINK IN A WIRELESS COMMUNICATION SYSTEM INCLUDING RELAY

(75) Inventors: Kyu Jin Park, Gyeongki-do (KR); Jae Hoon Chung, Gyeongki-do (KR); Han Kyu Cho, Gyeongki-do (KR); Eun Jong Lee, Gyeongki-do (KR); Doo Hyun Sung, Gyeongki-do (KR)

(73) Assignee: LG Electronics Inc., Seoul (KR)

( * ) Notice: Subject to any disclaimer, the term of this patent is extended or adjusted under 35 U.S.C. 154(b) by 295 days.

(21) Appl. No.: 13/056,799

(22) PCT Filed: Jul. 31, 2009

(86) PCT No.: PCT/KR2009/004307
§ 371 (c)(1),
(2), (4) Date: Jan. 31, 2011

(87) PCT Pub. No.: WO2010/013980
PCT Pub. Date: Feb. 4, 2010

(65) Prior Publication Data
US 2011/0128893 A1    Jun. 2, 2011

Related U.S. Application Data

(60) Provisional application No. 61/085,427, filed on Aug. 1, 2008.

(51) Int. Cl.
*H04W 72/04* (2009.01)
*H04W 74/08* (2009.01)
*H04W 74/04* (2009.01)
*H04W 16/12* (2009.01)

(52) U.S. Cl.
CPC .......... *H04W 74/0866* (2013.01); *H04W 74/04* (2013.01); *H04W 16/12* (2013.01)
USPC ........... 370/279; 370/315; 370/328; 370/331; 455/443; 455/450; 455/464

(58) Field of Classification Search
CPC .. H04L 41/0896; H04W 16/02; H04W 16/12; H04W 28/18–28/20; H04W 74/04; H04W 74/0866; H04W 76/046
USPC ........... 370/338, 477, 236.1, 277, 280, 310.2, 370/314, 321–322, 328–331, 341, 345, 370/347–348, 431, 442–443, 458, 468; 455/435.1, 443, 450–452.1, 464, 7, 455/447–448
See application file for complete search history.

(56) References Cited

U.S. PATENT DOCUMENTS

2006/0098688 A1*  5/2006  Parkvall et al. ............... 370/477
2006/0281404 A1   12/2006  Lee et al.
(Continued)

FOREIGN PATENT DOCUMENTS

CN    1227220 A    9/1999
EP    1734774 A1   12/2006
(Continued)

OTHER PUBLICATIONS

Office Action issued in corresponding Japanese Patent Application No. 2011-521049 dated Jun. 8, 2012.
(Continued)

*Primary Examiner* — Charles C Jiang
*Assistant Examiner* — Mohamed Kamara
(74) *Attorney, Agent, or Firm* — Morgan, Lewis & Bockius LLP

(57) ABSTRACT

A resource allocation method of a relay station in a wireless communication system employing the relay station is provided. The method includes: receiving information on a resource allocation pattern for an access link and a backhaul link of a first frequency band; and determining a resource allocation pattern for an access link and a backhaul link of a second frequency band on the basis of the resource allocation pattern of the first frequency band, wherein the first frequency band is any one of an uplink frequency band and a downlink frequency band, and the second frequency band is a remaining one of the uplink frequency band and the downlink frequency band.

18 Claims, 17 Drawing Sheets

(56) References Cited

U.S. PATENT DOCUMENTS

| | | |
|---|---|---|
| 2007/0109962 A1 | 5/2007 | Leng et al. |
| 2008/0025251 A1 | 1/2008 | Lee et al. |
| 2008/0045144 A1* | 2/2008 | Fujita ............................. 455/7 |
| 2008/0063097 A1* | 3/2008 | Horiuchi et al. ............. 375/260 |
| 2008/0219229 A1* | 9/2008 | Zheng ........................... 370/338 |
| 2009/0088165 A1* | 4/2009 | Shen et al. .................... 455/436 |
| 2009/0285164 A1* | 11/2009 | Chin et al. .................... 370/329 |
| 2010/0014474 A1 | 1/2010 | Miki et al. |
| 2012/0033603 A1* | 2/2012 | Seo et al. ...................... 370/312 |
| 2012/0281616 A1* | 11/2012 | Calvanese Strinati ........ 370/315 |

FOREIGN PATENT DOCUMENTS

| | | |
|---|---|---|
| EP | 1806945 A2 | 7/2007 |
| EP | 1879409 A1 | 1/2008 |
| JP | 2007-143137 A | 6/2007 |
| KR | 2006-0129807 | 12/2006 |
| KR | 2007-0074110 | 1/2007 |
| KR | 2007-0050836 | 5/2007 |
| WO | 2007/120023 A1 | 10/2007 |
| WO | 2008/021724 A2 | 2/2008 |
| WO | 2008/041653 A1 | 4/2008 |

OTHER PUBLICATIONS

International Search Report from PCT/KR2009/004307.
Office Action issued in corresponding Chinese Patent Application No. 200980130357.9 dated Feb. 27, 2013.
Long et al. "Comparison of LTE TDD and LTE FDD," Wireless Communication Division, Research Institute of China Mobile: 297-304, Jul. 1, 2008.

* cited by examiner

RESOURCE ALLOCATION METHOD FOR BACKHAUL LINK AND ACCESS LINK IN A WIRELESS COMMUNICATION SYSTEM INCLUDING RELAY

TECHNICAL FIELD

The present application is a national stage of PCT International Application No. PCT/KR2009/004307 filed Jul. 31, 2009, and claims the benefit of U.S. Provisional Application No. 61/085,427, filed Aug. 1, 2008.

BACKGROUND ART

Wireless communication systems are widely spread all over the world to provide various types of communication services such as voice or data. In general, the wireless communication system is a multiple access system capable of supporting communication with multi-users by sharing available radio resources. Examples of the radio resource include time, frequency, code, transmit power, etc. Examples of the multiple access system include a time division multiple access (TDMA) system, a code division multiple access (CDMA) system, a frequency division multiple access (FDMA) system, an orthogonal frequency division multiple access (OFDMA) system, a single carrier frequency division multiple access (SC-FDMA) system, etc. The radio resource is a time in the TDMA system, a frequency in the FDMA system, a code in the CDMA system, and a subcarrier and a time in the OFDMA system. A wireless communication system is a system supporting bidirectional communication. The bidirectional communication can be performed by using a time division duplex (TDD) mode, a frequency division duplex (FDD) mode, a half-frequency division duplex (H-FDD) mode, etc. The TDD mode uses a time resource to identify uplink transmission and downlink transmission. The FDD mode uses a frequency resource to identify uplink transmission and downlink transmission. The H-FDD mode uses a combination of a time resource and a frequency resource to identify uplink transmission and downlink transmission.

The wireless communication system includes a base station (BS) providing a service to a specific region (i.e., a cell). According to a characteristic of a wireless transmission technology, changes in a wireless environment have an effect on quality of signal transmitted. In particular, due to various factors in a surrounding environment, such as scatters, movement of a mobile station (MS), etc., a wireless channel changes over time. In addition, there is a restriction in terms of distance since reception power is rapidly decreased in proportion to a distance between wireless communication entities. Therefore, in general, the MS can communicate with the BS when the MS is located within the coverage of the BS. As such, due to several factors such as the scatters, a movement speed of the MS, a distance between transmission and reception, etc., a maximum transfer rate, a throughput of an intra-cell user, and a throughput of a whole cell are decreased between the BS and the MS. For example, when the MS is located in a cell boundary or when an obstacle such as a building exists between the MS and the BS, communication quality between the MS and the BS may not be satisfactory.

As an effort to overcome the aforementioned problem, several techniques are introduced to compensate for deterioration of signals transmitted between the BS and the MS, thereby obtaining a maximum transfer rate, throughput improvement, coverage expansion, etc. For this purpose, a wireless communication system may employ a relay station (RS). For example, a relay technique is one of main techniques for long term evolution (LTE)-advanced which is one of promising candidates of international mobile telecommunication (IMT)-advanced, i.e., a mobile communication system of a next generation (post-$3^{rd}$ generation). The RS is an apparatus for relaying a signal between the BS and the MS, and can extend the coverage of the BS and improve a cell throughput.

SUMMARY OF INVENTION

Technical Problem

The present invention provides a frame structure supporting a relay station. More particularly, the present invention provides a method of properly allocating resources for a backhaul link between a base station and a relay station and an access link between the relay station and a mobile station.

Technical Solution

According to an aspect of the present invention, a resource allocation method in a wireless communication system employing a relay station is provided. The method includes: receiving information on a resource allocation pattern for an access link and a backhaul link of a first frequency band; and determining a resource allocation pattern for an access link and a backhaul link of a second frequency band on the basis of the resource allocation pattern of the first frequency band, wherein the first frequency band is any one of an uplink frequency band and a downlink frequency band, and the second frequency band is any one of the uplink frequency band and the downlink frequency band.

In the aforementioned aspect of the present invention, at least one pair of subframes may be allocated to a subframe for the access link in every frame which is configured with 10 subframes in the downlink frequency band.

In addition, the pair of subframes may be two subframes spaced apart by 5 subframes.

In addition, the resource allocation pattern of the first frequency band and the resource allocation pattern of the second frequency band may be determined in every frame configured with 10 subframes.

In addition, the resource allocation pattern of the first frequency band and the resource allocation pattern of the second frequency band may be determined in every 40 subframes corresponding to the minimum common multiple of the maximum number of hybrid automatic request repeat (HARQ) channels and the number of subframes constituting one frame.

In addition, the method may further include re-determining an acknowledgment/not-acknowledgement (ACK/NACK) feedback time for data transmission on the basis of the resource allocation pattern of the first frequency band and the resource allocation pattern of the second frequency band.

In addition, the method may further include reporting information on the ACK/NACK feedback time to a mobile station.

According to another aspect of the present invention, a resource allocation method of a base station in a wireless communication system employing a relay station is provided. The method includes: determining information on a resource allocation pattern for an access link and a backhaul link of a first frequency band; and determining a resource allocation pattern for an access link and a backhaul link of a second frequency band on the basis of the resource allocation pattern of the first frequency band, wherein the first frequency band is any one of an uplink frequency band and a downlink frequency band, and the second frequency band is any one of the uplink frequency band and the downlink frequency band.

In the aforementioned aspect of the present invention, the method may further include transmitting information on the resource allocation pattern of the first frequency band and information on the resource allocation pattern of the second frequency band to the relay station.

According to another aspect of the present invention, a relay station is provided. The relay station includes: a processor; and a radio frequency (RF) unit, coupled to the processor, for transmitting and receiving a radio signal, wherein the processor receives information on a resource allocation pattern for an access link and a backhaul link of a first frequency band, and determines a resource allocation pattern for an access link and a backhaul link of a second frequency band on the basis of the resource allocation pattern of the first frequency band, and wherein the first frequency band is any one of an uplink frequency band and a downlink frequency band, and the second frequency band is any one of the uplink frequency band and the downlink frequency band.

Advantageous Effects

According to the present invention, a frame structure supporting a relay station can be provided. In particular, a resource allocation method for a backhaul link and an access link can be provided. In addition, a method of reducing an error at an acknowledgement (ACK)/not-acknowledgement (NACK) transmission time can be provided in a process of performing hybrid automatic request repeat (HARQ) on the basis of the frame structure supporting the relay station.

MODE FOR INVENTION

The technique described below can be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in a downlink and employs the SC-FDMA in an uplink.

For clarity of explanation, the following description will focus on the 3GPP LTE-advanced. However, the technical features of the present invention are not limited thereto. 3GPP LTE-advanced (hereinafter, LTE-A) is an evolution of 3GPP LTE (hereinafter, LTE).

Figure 1:
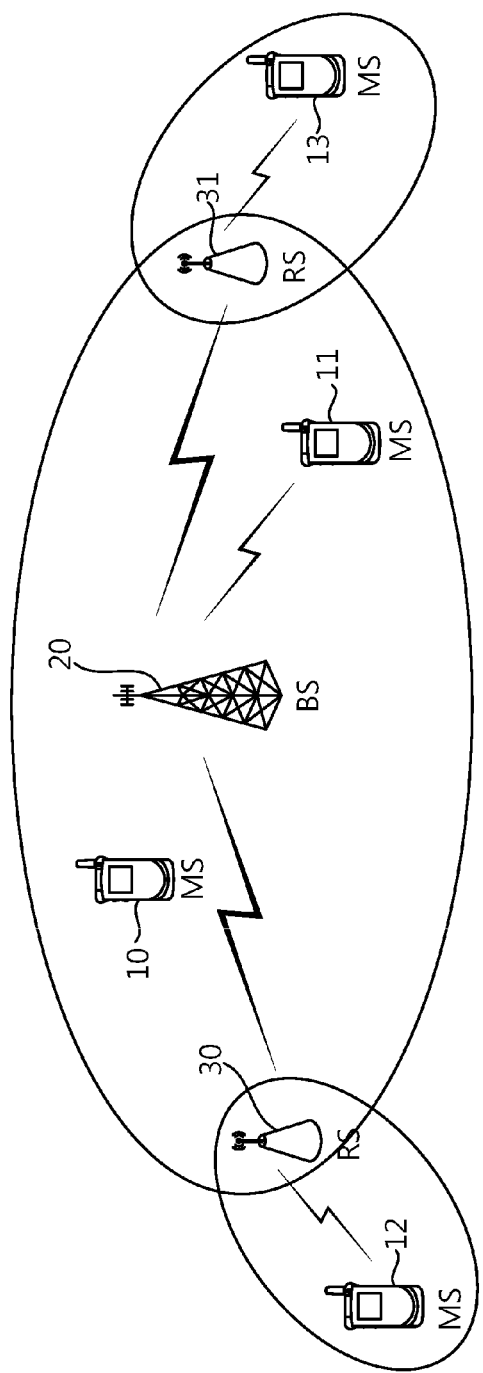
FIG. 1 is a diagram showing a wireless communication system employing a relay station.

FIG. 1 is a diagram showing a wireless communication system employing a relay station. The wireless communication system can be widely deployed to provide a variety of communication services, such as voices, packet data, etc.

Referring to FIG. 1, the wireless communication system includes mobile stations (MSs) 10, 11, 12, and 13, a base station (BS) 20, and relay stations (RSs) 30 and 31. Each of the MSs 10, 11, 12, and 13 may be fixed or mobile, and may be referred to as another terminology, such as a user equipment (UE), a user terminal (UT), a subscriber station (SS), a wireless device, etc. The BS 20 is generally a fixed station that communicates with the MSs 10, 11, 12, and 13 and may be referred to as another terminology, such as a node-B, a base transceiver system (BTS), an access point, etc. One or more cells may exist in the coverage of one BS 20. The RSs 30 and 31 are provided for coverage extension or data transfer rate improvement resulted from a diversity effect, and are located between the MS and the BS. The RS may be referred to as another terminology, such as a repeater, a relay, a relay node (RN), etc. That is, the MSs 10 and 11 located inside the coverage of the BS 20 can directly communicate with the BS 20, and the MSs 12 and 13 located outside the coverage of the BS 20 communicate with the BS 20 via the RSs 30 and 31. Alternatively, for the data transfer rate improvement resulted from the diversity effect, even the MSs 10 and 11 located inside the coverage of the BS 20 may communicate with the BS 20 via the RSs 30 and 31.

The RS can be classified into several types as follows.

TABLE 1

| function | L1 Relay | L2 Relay | L3 Relay | Pico/Femto Cell |
|---|---|---|---|---|
| RF function | X | X | X | X |
| Coder/Decoder and CRC | — | X | X | X |
| HARQ | — | X | X | X |
| Multiplex & Demultiplex of MAC SDU | — | X | X | X |
| Priority(QoS) handling | — | X | X | X |
| Scheduling | — | X | X | X |
| Outer ARQ | — | (X) | X | X |
| (Re)-Segmentation and concatenation | — | (X) | X | X |
| Header compression(ROHC) | — | — | — | X |
| Reordering of lower layer SDUs | — | — | — | |
| In-sequence delivery of upper layer PDUs | — | — | — | |
| Duplicate detection of lower layer SDUs | — | — | — | X |
| Ciphering | — | — | — | X |
| System information broadcast | — | — | X | X |
| RRC Connection set-up and maintenance | — | — | X | X |
| Radio Bearers set-up and maintenance | — | — | — | X |
| Mobility function | — | — | X | |
| MBMS services control | — | — | — | X |
| Paging | — | — | — | X |
| QoS management | — | — | (X) | X |
| UE measurement reporting and control the reporting | — | — | (X) | X |
| NAS signalling handling | — | — | — | X |

In Table 1, 'X' denotes that a corresponding function is supported, '-' denotes that the corresponding function is not supported, and '(X)' denotes that the corresponding function may be supported or not supported. L1 relay, L2 relay, and L3 relay classified in Table 1 are for exemplary purposes only. The L1, L2, and L3 relays are classified herein according to a general feature, and thus other terms may also be used. By reference, Table 1 also shows a function of a femto cell or a pico cell. It is assumed that the femto cell or the pico cell supports all functions shown in Table 1. The L1 relay is a relay having some additional functions together with amplify and forward (AF). The L1 relay amplifies a signal received from a BS or an MS and then delivers the signal to the MS or the BS. The L2 relay is a relay having a scheduling function together with decoding and forward (DF). The L2 relay restores information by performing demodulation, decoding, and the like on a signal received from the BS or the MS, and then generates a signal by performing coding, modulation, and the like and delivers the signal to the MS or the BS. The L3 relay is a relay having a pattern similar to one cell, and supports call access, release, and mobility functions together with the functions of the L2 relay. The L3 relay, the femto cell, and the pico cell have an ability to change partially or entirely a frame structure. That is, they are RSs capable of controlling a relay cell. On the other hand, the L1 relay and the L2 relay do not have the ability to change partially or entirely the frame structure. That is, they are RSs not capable of controlling the relay cell. Therefore, the L1 relay and the L2 relay are used to relay only data, and the BS directly transmits a control channel to the MS. Unless otherwise specified, the L1 relay, the L2 relay, the L3 relay, the pico cell, and the femto cell are collectively referred to as an RS in the present invention.

The RS can transmit or receive data by using a radio resource. The radio resource that can be used by the RS includes a time resource, a frequency resource, a space resource, etc. The time resource is expressed by a subframe, a symbol, a slot, etc. The frequency resource is expressed by a subcarrier, a resource block, a component carrier, etc. The space resource is expressed by spatial multiplexing, an antenna, etc. The radio resource can be dedicatedly used between a BS and an RS or between the RS and an MS, or can be shared between them.

Figure 2:
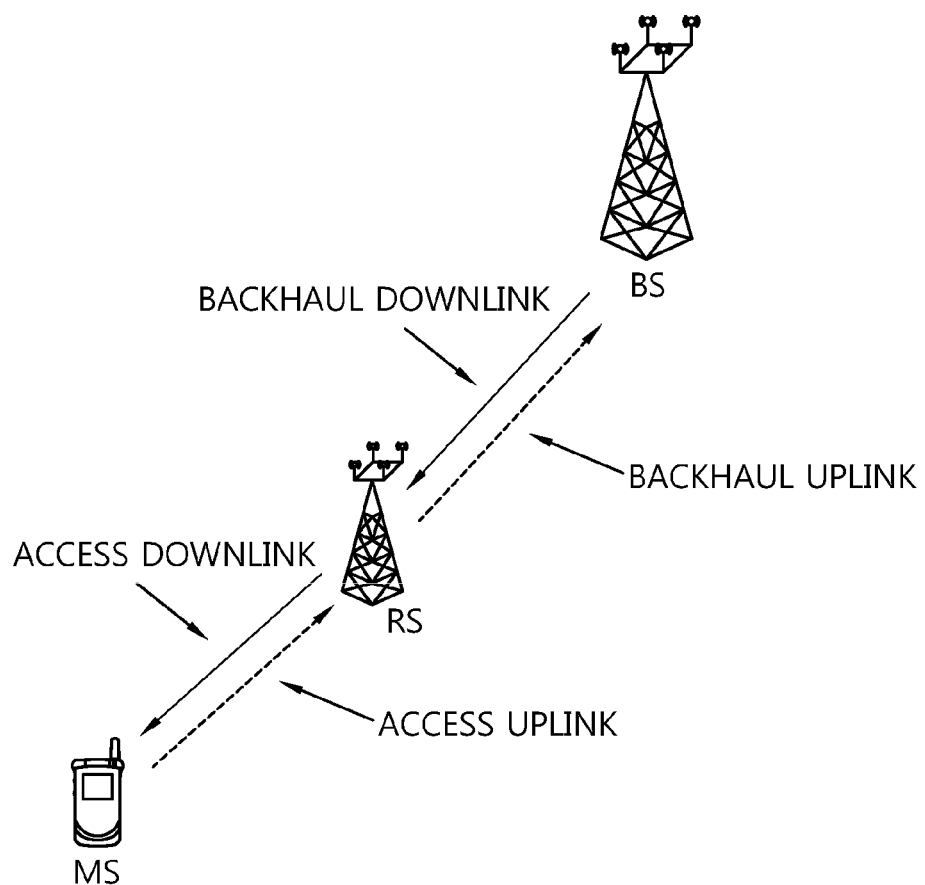
FIG. 2 shows a link configuration among a base station, a relay station, and a mobile station.

FIG. 2 shows a link configuration among a BS, an RS, and an MS.

Referring to FIG. 2, a link between the BS and the RS is a backhaul link, and a link between the RS and the MS is an access link. The backhaul link between the BS and the RS can operate in a frequency division duplex (FDD) mode or a time division duplex (TDD) mode. Likewise, the access link between the RS and the MS can operate in the FDD mode or the TDD mode. In the FDD mode, uplink and downlink are divided by a frequency resource. In the TDD mode, uplink and downlink are divided by a time resource. In the FDD mode, a backhaul downlink is when transmission is performed on the backhaul link by using a downlink frequency band, and a backhaul uplink is when transmission is performed on the backhaul link by using an uplink frequency band. In addition, an access downlink is when transmission is performed on the access link by using the downlink frequency band, and an access uplink is when transmission is performed on the access link by using the uplink frequency band. In the TDD mode, a backhaul downlink is when transmission is performed on the backhaul link by using a downlink subframe, and a backhaul uplink is when transmission is performed on the backhaul link by using an uplink subframe. In addition, an access downlink is when transmission is performed on the access link by using the downlink subframe, and an access uplink is when transmission is performed on the access link by using the uplink subframe. A radio resource allocated for the backhaul link is referred to as a relay zone, and a radio resource allocated for the access link is referred to as an access zone.

Table 2 below summarizes transmission/reception functions of the BS, the RS, and the MS.

TABLE 2

| Function | BS | RS | MS |
|---|---|---|---|
| downlink transmission | V | V | |
| downlink reception | | V | V |
| uplink transmission | | V | V |
| uplink reception | V | V | |

Referring to Table 2, the BS can perform transmission by using a downlink resource, and can perform reception by using an uplink resource. The MS can perform reception by using the downlink resource, and can perform transmission by using the uplink resource. On the other hand, the RS can perform transmission or reception by using the downlink resource, and can perform transmission and reception by using the uplink resource.

Figure 3:
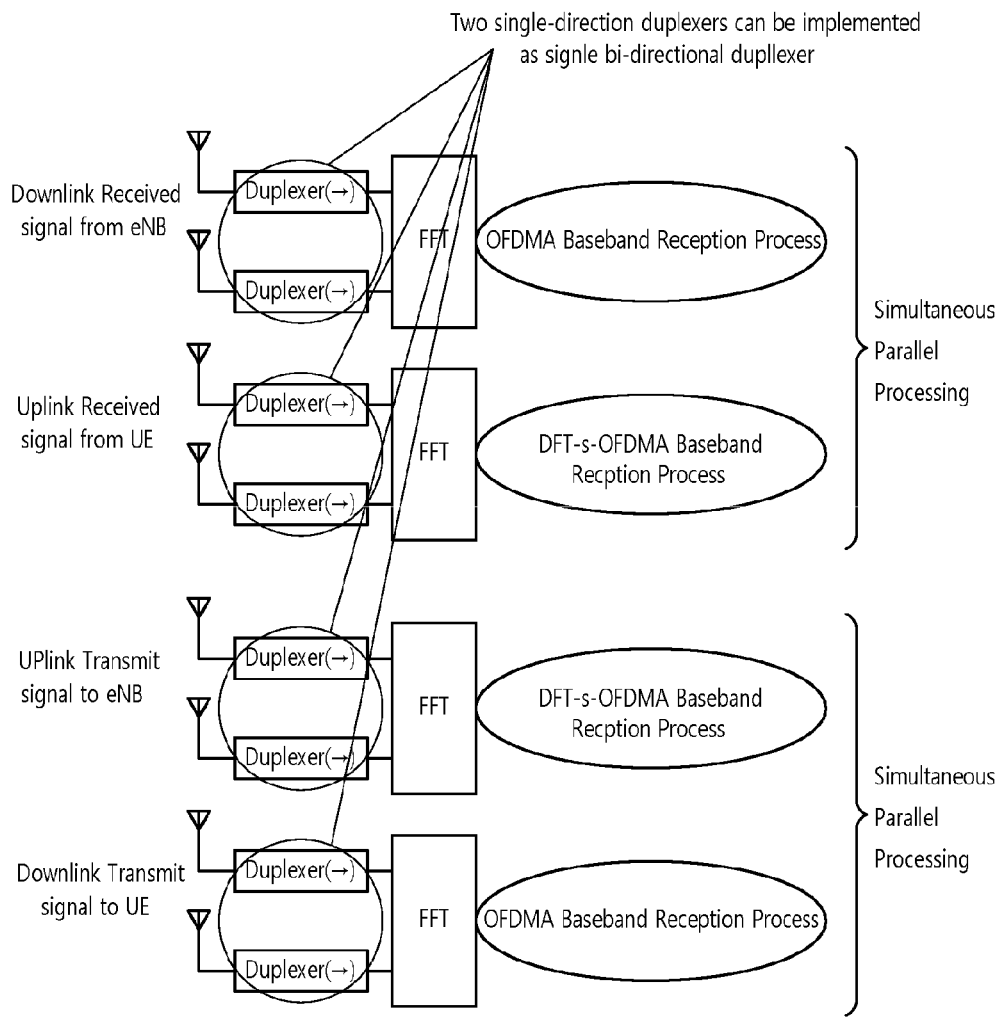
FIG. 3 shows a transmission/reception function from the perspective of an apparatus.

FIG. 3 shows a transmission/reception function from the perspective of an apparatus. For convenience of explanation, the present invention assumes that an RS operates in an FDD mode. However, this is for exemplary purposes only, and thus the RS can also operate in a TDD mode or a half-FDD (H-FDD) mode. In addition, it is also assumed that the RS uses an orthogonal frequency division multiplex access (OFDMA) scheme in downlink transmission, and uses a discrete Fourier transform-spread-OFDMA (DFT-s-OFDMA) scheme in uplink transmission. The DFT-s-OFDMA scheme can also be referred to as a single carrier-frequency division multiplex access (SC-FDMA) scheme, and both terms are used together.

Referring to FIG. 3, the RS may include two reception modules for receiving a signal from a BS or an MS. Further, the RS may include two transmission modules for transmitting a signal to the BS or the MS. For easy understanding, the transmission and reception modules are simplified to include only a duplexer and a signal processing module. The duplexer is either a unidirectional duplexer or a bidirectional duplexer according to a function. In case of the unidirectional duplexer, as shown in FIG. 3, each duplexer is coupled to only any one of the transmission module and the reception module. On the other hand, in case of the bidirectional duplexer, each duplexer can be coupled to both of the transmission module and the reception module.

In general, the RS is prevented from performing transmission and reception operations simultaneously, and thus the transmission module and the reception module can process signals at different times. On the other hand, the RS is allowed to receive signals simultaneously from the BS and the MS or transmit signals simultaneously to the BS and the MS. Therefore, parallel signal processing can be performed at the same time or similar times between the transmission modules or between the reception modules.

In the signal processing, a downlink signal received from the BS is processed by fast Fourier transform (FFT) and an OFDMA baseband reception process. Similarly, a downlink signal to be transmitted to the MS is processed by an OFDMA baseband transmission process and inverse fast Fourier transform (IFFT). Specifically, the OFDMA baseband transmission process may include a serial/parallel conversion module and a subcarrier mapping module. That is, the OFDMA baseband transmission process converts a high-speed serial data symbol into a slow parallel data symbol, and then maps the resultant symbol to a subcarrier. The OFDMA baseband reception process processes a signal in the opposite manner as the OFDMA baseband transmission process.

Meanwhile, an uplink signal received from the MS is processed by FFT and a DFT-s-OFDMA baseband reception process. Similarly, an uplink signal to be transmitted to the BS is processed by a DFT-s-OFDMA baseband transmission process and IFFT. Specifically, the DFT-s-OFDMA baseband transmission process may include a serial/parallel conversion module, a DFT module, and a subcarrier mapping module. The DFT-s-OFDMA baseband transmission process differs from the OFDMA baseband transmission process in that a data symbol can be spread in a frequency domain by using DFT before IFFT in order to decrease a peak-to-average power ratio (PAPR) of a transmission symbol. A data symbol subjected to the DFT module can be either contiguously or discontinuously mapped to a subcarrier. The DFT-s-OFDMA baseband reception process processes a signal in the opposite manner as the DFT-s-OFDMA baseband transmission process.

Figure 4:
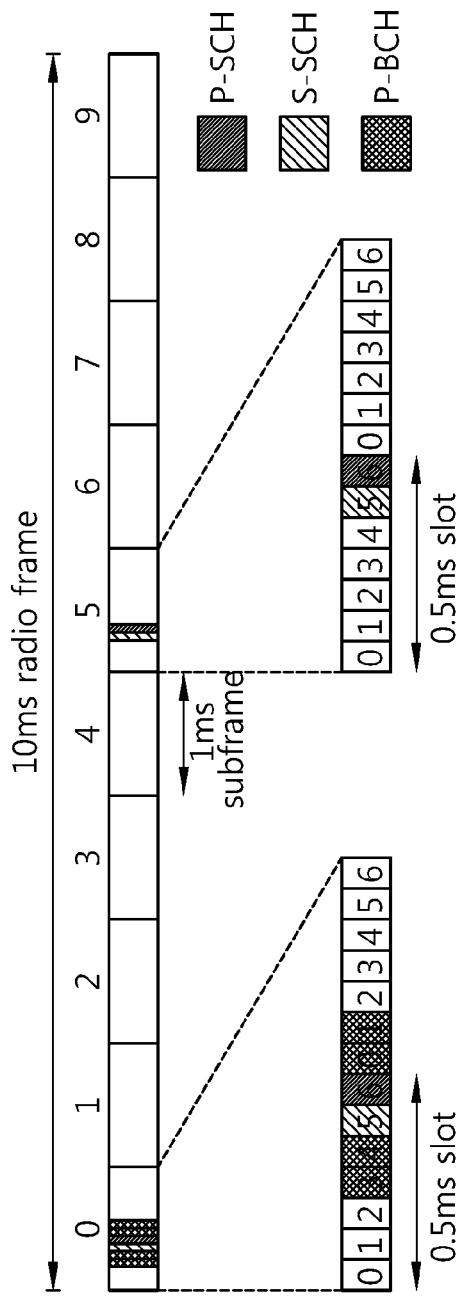
FIG. 4 shows an example of a radio frame structure.

FIG. 4 shows an example of a radio frame structure. Herein, a radio frame uses a normal cyclic prefix (CP).

Referring to FIG. 4, the radio frame includes 10 subframes. One subframe may include two slots. One slot may include a plurality of OFDM symbols or SC-FDMA symbols in a time domain. The number of OFDM symbols or SC-FDMA symbols included in one slot may be determined variously according to a CP configuration. In a radio frame using a normal CP size, one slot may include 7 OFDM symbols or SC-FDMA symbols. When an OFDM symbol or an SC-FDMA symbol has a length of 2048 Ts in a radio frame having a length of 10 ms, the normal CP size may be 144 Ts (Ts=1/(15000*2048) sec).

In case of a downlink radio frame, a primary synchronization channel (P-SCH) is located in a last OFDM symbol of a $0^{th}$ slot and a $10^{th}$ slot. The same primary synchronization signal (PSS) is transmitted through 2 P-SCHs. The P-SCH is used to obtain time domain synchronization such as OFDM symbol synchronization, slot synchronization and/or frequency domain synchronization. A Zadoff-Chu (ZC) sequence can be used as the PSS. At least one PSS exists in a wireless communication system.

A secondary synchronization channel (S-SCH) is located in an immediately previous OFDM symbol from the last OFDM symbol of the $0^{th}$ slot and the $10^{th}$ slot. The S-SCH and the P-SCH can be located in contiguous OFDM symbols. Different secondary synchronization signals (SSSs) are transmitted through two S-SCHs. The S-SCH is used to obtain frame synchronization and/or CP configuration of a cell, i.e., usage information of a normal CP or an extended CP. One S-SCH uses two SSSs. An m-sequence may be used as the SSS. That is, one S-SCH includes two m-sequences. For example, if one S-SCH includes 63 subcarriers, two m-sequences each having a length of 31 are mapped to S-SCH.

The P-SCH and the S-SCH are used to obtain physical-layer cell identities (IDs). The physical-layer cell ID can be expressed by 168 physical-layer ID groups and 3 physical-layer IDs belonging to each physical-layer ID group. That is, a total number of physical-layer cell IDs is 504, and the physical-layer cell IDs are expressed by a physical-layer ID group in the range of 0 to 167 and physical-layer IDs included in each physical-layer cell ID and having a range of 0 to 2. The P-SCH may use 3 ZC sequence root indices indicating the physical-layer IDs. The S-SCH may use 168 m-sequence indices indicating the physical-layer cell ID groups.

A physical-broadcast channel (P-BCH) is located in a $0^{th}$ subframe in the radio frame. The P-BCH starts from a $3^{rd}$ OFDM symbol (starting from a $0^{th}$ OFDM symbol) of the $0^{th}$ subframe and occupies 4 OFDM symbols excluding the P-SCH and the S-SCH. The P-BCH is used to obtain basic system configuration information of a corresponding BS. The P-BCH may have a period of 40 ms.

The radio frame structure of FIG. 4 is for exemplary purposes only, and thus the number of subframes included in the radio frame or the number of slots included in the subframe may change variously.

Figure 5:
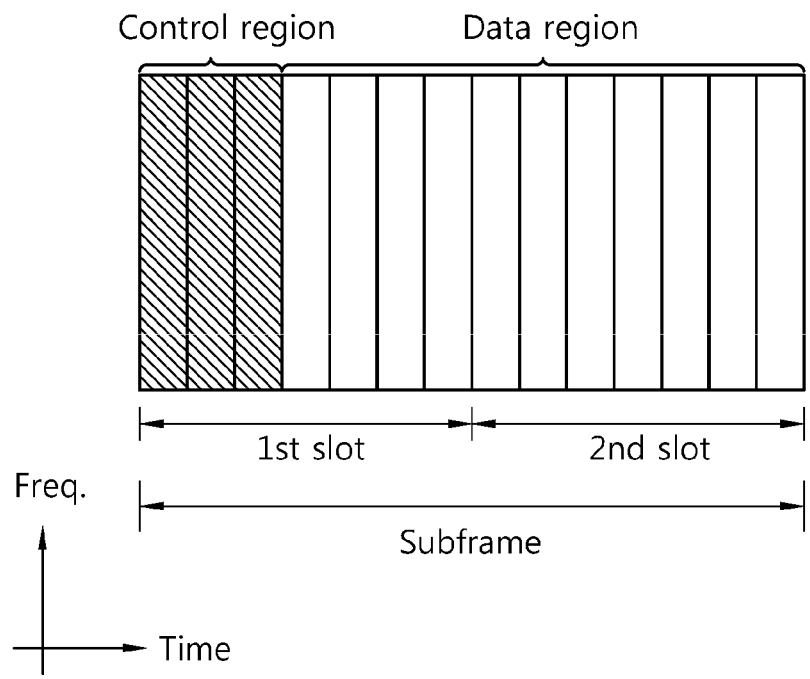
FIG. 5 shows an example of a downlink subframe structure.

FIG. 5 shows an example of a downlink subframe structure. A subframe includes two slots in a time domain. Up to three preceding OFDM symbols of a $1^{st}$ slot in the subframe correspond to a control region to be allocated with physical channels. The remaining OFDM symbols correspond to a data region to be allocated with a physical downlink shared channel (PDSCH).

Examples of downlink control channels used in 3$^{rd}$ generation partnership project (3GPP) long term evolution (LTE) include a physical control format indicator channel (PCFICH), a physical downlink control channel (PDCCH), a physical hybrid-ARQ indicator channel (PHICH), etc. The PCFICH transmitted in a first OFDM symbol of a subframe carries information regarding the number of OFDM symbols (i.e., a size of the control region) used for transmission of control channels in the subframe. Control information transmitted through the PDCCH is referred to as downlink control information (DCI). The DCI indicates uplink resource allocation information, downlink resource allocation information, an uplink transmit power control command for any UE groups, etc. The PHICH carries an acknowledgement (ACK)/not-acknowledgement (NACK) signal for an uplink hybrid automatic repeat request (HARQ). That is, an ACK/NACK signal for uplink data transmitted by a UE is transmitted through the PHICH.

Figure 6:
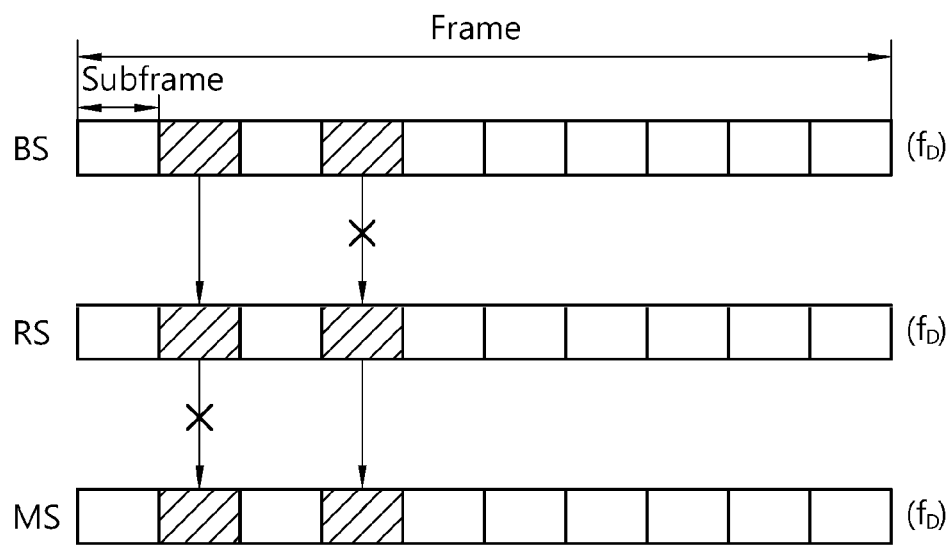
FIG. 6 and FIG. 7 show an example of an operation of a relay station.
Figure 7:
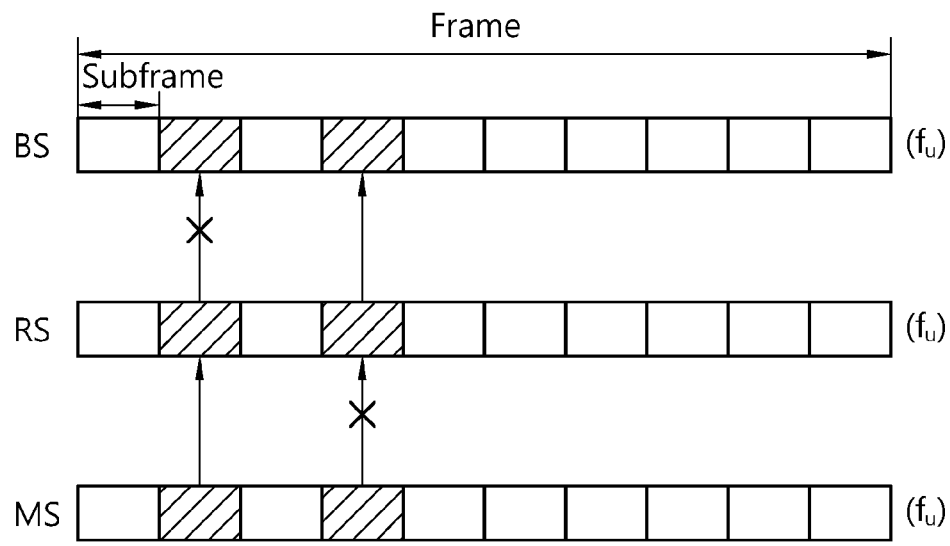

FIG. 6 and FIG. 7 show an example of an operation of an RS. Hereinafter, unless otherwise specified, an MS connected to the RS is simply referred to as an MS. FIG. 6 shows an example of downlink transmission using a downlink frequency band $f_D$. FIG. 7 shows an example of uplink transmission using an uplink frequency band $f_U$. It is assumed that the downlink frequency band $f_D$ and the uplink frequency band $f_U$ are different frequency bands.

Referring to FIG. 6, when an RS receives a signal from a BS through a backhaul link, the RS cannot transmit the signal to an MS through an access link. When the RS transmits a signal to the MS through the access link, the RS cannot receive the signal from the BS through the backhaul link.

Referring to FIG. 7, when an RS receives a signal from an MS through an access link, the RS cannot transmit the signal to a BS through a backhaul link. When the RS transmits a signal to the BS through the backhaul link, the RS cannot receive the signal from the MS through the access link.

As shown in FIG. 6 and FIG. 7, the RS cannot simultaneously transmit and receive signals by using the same frequency band. Therefore, a frame structure of the RS needs to be defined for each of the downlink frequency band and the uplink frequency band. In particular, there is a need to allocate a resource for the backhaul link and the access link.

Hereinafter, a criterion for allocating a resource for a backhaul link and an access link in a downlink frequency band and an uplink frequency band will be proposed according to an embodiment of the present invention.

Criterion 1

The backhaul link and the access link follow a time division multiplexing (TDM) scheme in each of the downlink frequency band and the uplink frequency band. In this case, the backhaul link and the access link can be allocated in a unit of one subframe or a multiple of one subframe. For example, one subframe is 1 ms.

Criterion 2

At least one pair of subframes in one frame must be allocated for the access link in the downlink frequency band. For example, one pair of subframes may include a $k^{th}$ subframe and a $(k+5)^{th}$ subframe.

Criterion 3

A resource allocation pattern for the backhaul link and the access link is determined in every specific period.

Criterion 4

The resource allocation pattern for the backhaul link and the access link is determined by the BS, and are signaled to each RS.

Criterion 5

When switching is made in a frame from the backhaul link to the access link or from the access link to the backhaul link, some regions can be determined as an idle time for TTG/RTG.

Criterion 6

When the BS first determines a resource allocation pattern for any one of the downlink frequency band and the uplink frequency band, a resource allocation pattern of the remaining one frequency band is determined based on the first determined resource allocation pattern.

Hereinafter, a method of determining a resource allocation pattern for a backhaul link and an access link according to the criterion 2 to the criterion 6 will be described in detail for example in reference to FIG. 8 to FIG. 15.

Figure 8:
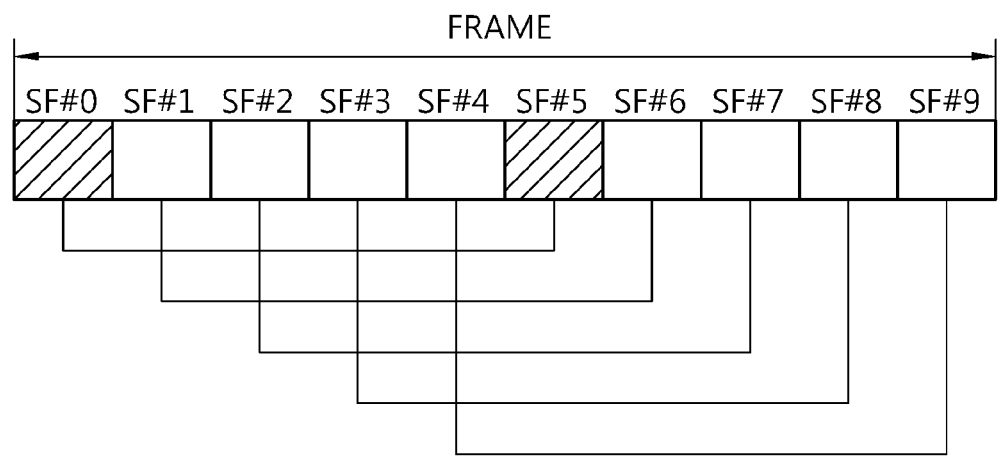
FIG. 8 shows a frame structure of a downlink frequency band according to an embodiment of the present invention.

FIG. 8 shows a frame structure of a downlink frequency band according to an embodiment of the present invention (criterion 2).

Referring to FIG. 8, a frame consists of 10 subframes. Among subframes constituting the frame, a subframe #0 and a subframe #5 can constitute one pair. Likewise, (a subframe #1 and a subframe #6), (a subframe #2 and a subframe #7), (a subframe #3 and a subframe #8), and (a subframe #4 and a subframe #9) each constitute one pair. Among them, at least one pair of subframes must be allocated to a subframe for the access link. This is to transmit a control signal to MSs belonging to the coverage of an RS. Examples of the control signal include a synchronization signal, a broadcast signal, a paging signal, etc. For example, in an FDD frame, the subframe #0 and the subframe #5 are subframes in which the synchronization signal and/or the broadcast signal are transmitted, and the subframe #0, the subframe #4, the subframe #5, and the subframe #9 are subframes in which the paging signal is transmitted. Therefore, (the subframe #0 and the subframe #5) and (the subframe #4 and the subframe #9) can be allocated for the access link. Likewise, in a TDD frame, the subframe #0 and the subframe #5 are subframes in which the synchronization signal and/or the broadcast signal are transmitted, and the subframe #0, the subframe #1, the subframe #5, and the subframe #6 are subframes in which the paging signal is transmitted. Therefore, (the subframe #0 and the subframe #5) and (the subframe #1 and the subframe #6) can be allocated for the access link. Accordingly, in the FDD frame, the subframe #0, the subframe #4, the subframe #5, and the subframe #9 must be allocated for the access link, and cannot be allocated for the backhaul link, and in the TDD frame, the subframe #0, the subframe #1, the subframe #5, and the subframe #6 must be allocated for the access link, and cannot be allocated to the backhaul link.

Figure 9:
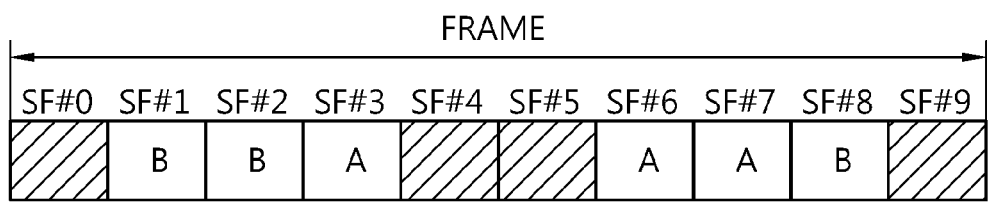
FIG. 9 shows a period of determining a resource allocation pattern according to an embodiment of the present invention.

FIG. 9 shows a period of determining a resource allocation pattern according to an embodiment of the present invention (criterion 3).

Referring to FIG. 9, the resource allocation pattern can be determined with a period of one frame (i.e., 10 ms). In this case, since one frame consists of 10 subframes, the resource allocation pattern can be expressed with 10 bits. Alternatively, the resource allocation pattern can be expressed with 6 bits except for 4 subframes in which a synchronization signal, a broadcast signal, and a paging signal must be transmitted. That is, as shown in FIG. 9, when a subframe #0, a subframe #4, a subframe #5, and a subframe #9 are determined as subframes for transmitting the synchronization signal, the broadcast signal, and the paging signal, and when a subframe #1, a subframe #2, and a subframe #8 are allocated for the backhaul link and a subframe #3, a subframe #6, and a subframe #7 are allocated for the access link, the resource allocation pattern can be expressed by "001110". Herein, "0" and "1" can be interpreted oppositely.

Figure 10:
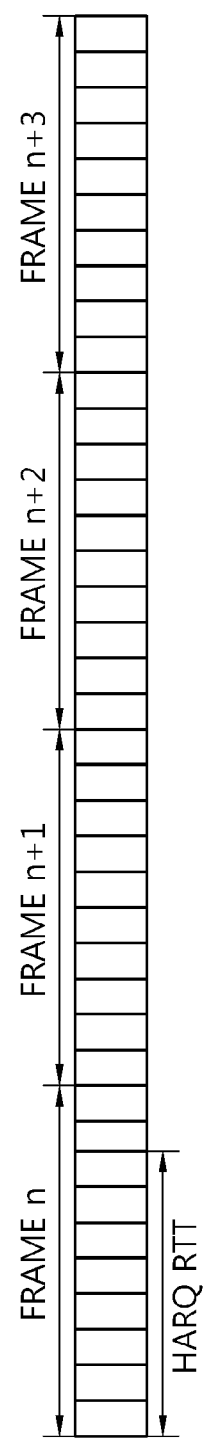
FIG. 10 shows a period of determining a resource allocation pattern according to another embodiment of the present invention.

FIG. 10 shows a period of determining a resource allocation pattern according to another embodiment of the present invention (criterion 3).

Referring to FIG. 10, the resource allocation pattern can be determined with a period corresponding to the least common multiple of the number of hybrid automatic request repeat (HARQ) channels and the number of subframes included in one frame. That is, according to an LTE standard, since a time required from initial data transmission to retransmission is 8 ms in the process of performing HARQ, the number of HARQ channels can be 8. Therefore, the resource allocation pattern can be determined in a unit of 40 ms which is the least common multiple of 8 and 10. In this case, the resource allocation pattern can be expressed by 40 bits. Alternatively, the resource allocation pattern can be expressed by 24 bits except for subframes in which a synchronization signal, a broadcast signal, and a paging signal must be transmitted.

Figure 11:
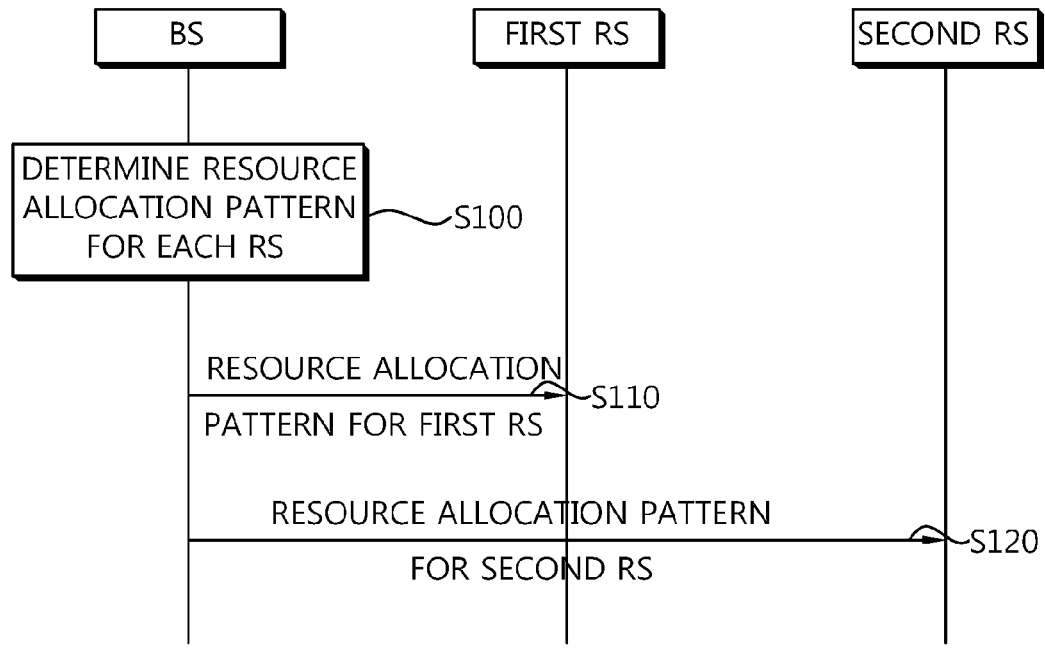
FIG. 11 is a flowchart showing a signaling method of a resource allocation pattern according to an embodiment of the present invention.

FIG. 11 is a flowchart showing a signaling method of a resource allocation pattern according to an embodiment of the present invention (criterion 4). It is assumed that a plurality of RSs exist for one BS.

Referring to FIG. 11, the BS determines the resource allocation pattern for the backhaul link and the access link for each RS (step S100). The BS transmits information on a resource allocation pattern determined for a first RS to the first RS (step S110), and transmits information on a resource allocation pattern for a second RS to the second RS (step S120). In this case, the BS can unicast information on the resource allocation pattern to each RS through a PDSCH.

Figure 12:
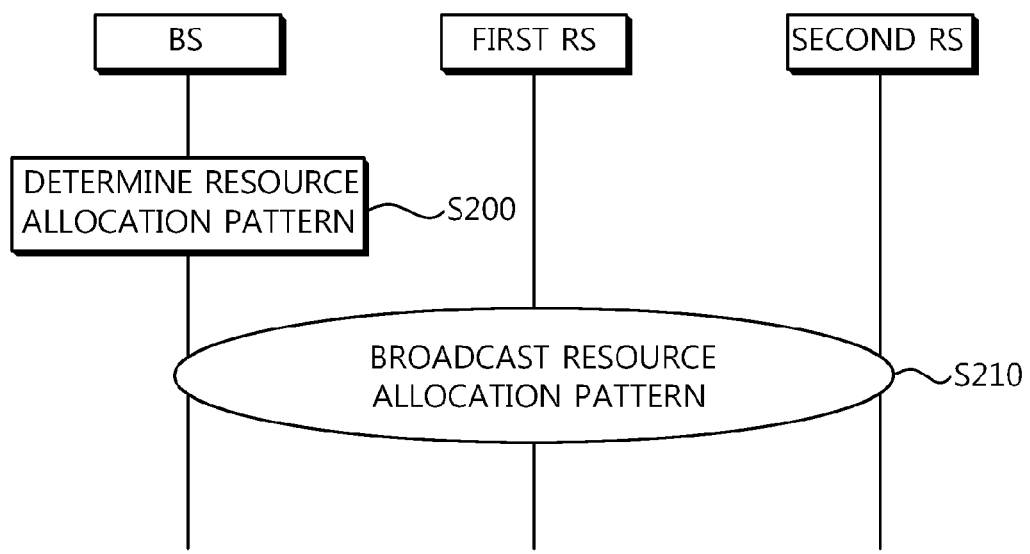
FIG. 12 is a flowchart showing a signaling method of a resource allocation pattern according to another embodiment of the present invention.

FIG. 12 is a flowchart showing a signaling method of a resource allocation pattern according to another embodiment of the present invention (criterion 4). It is assumed herein that a plurality of RSs exist for one BS.

Referring to FIG. 12, the BS determines a resource allocation pattern for the backhaul link and the access link for all RSs (step S200). The BS broadcasts information on the resource allocation pattern determined in step 200 to all RSs (step S210). In this case, the BS can broadcast information on the resource allocation pattern to the RS through a BCH. In addition thereto, the BS can unicast information on the same resource allocation pattern to each RS.

Referring to FIG. 11 and FIG. 12, the BS and the RS can share a table for a predetermined resource allocation pattern, and the BS can signal an index for a specific pattern to the RS.

Figure 13:
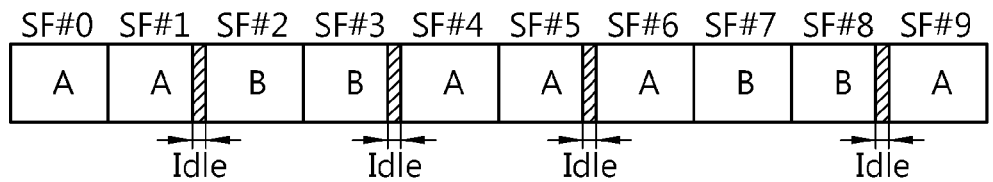
FIG. 13 shows a frame structure according to an embodiment of the present invention.

FIG. 13 shows a frame structure according to an embodiment of the present invention (criterion 5).

Referring to FIG. 13, when switching is made from the backhaul link to the access link or from the access link to the backhaul link, some regions immediately before the switching is achieved are configured as an idle time. For example, the idle time may be one OFDMA symbol. A subframe #1 and a subframe #6 in which the switching is made from the access link to the backhaul link and a subframe #3 and a subframe #9 in which the switching is made from the backhaul link to the access link are subframes including the idle time, and such subframes can be regarded as irregular subframes.

Figure 14:
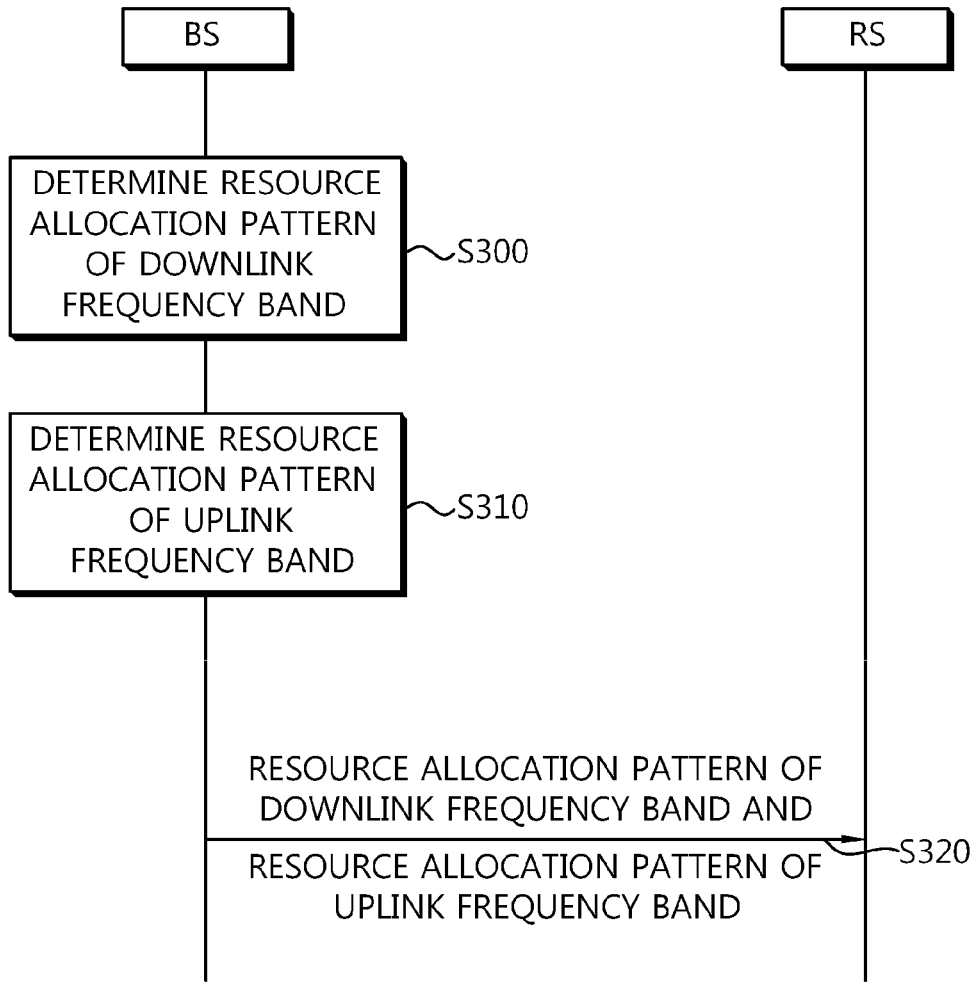
FIG. 14 is a flowchart showing a method of determining a resource allocation pattern according to an embodiment of the present invention.

FIG. 14 is a flowchart showing a method of determining a resource allocation pattern according to an embodiment of the present invention (criterion 6).

Referring to FIG. 14, a BS determines a resource allocation pattern for a backhaul link and an access link for a downlink frequency band (step S300). On the basis of the resource allocation pattern of the downlink frequency band determined in step S300, the BS determines a resource allocation pattern for a backhaul link and an access link for an uplink frequency band (step S310). The downlink frequency band' resource allocation pattern and the uplink frequency band' resource allocation pattern determined in step S300 and step S310 are transmitted to an RS (step S320).

Figure 15:
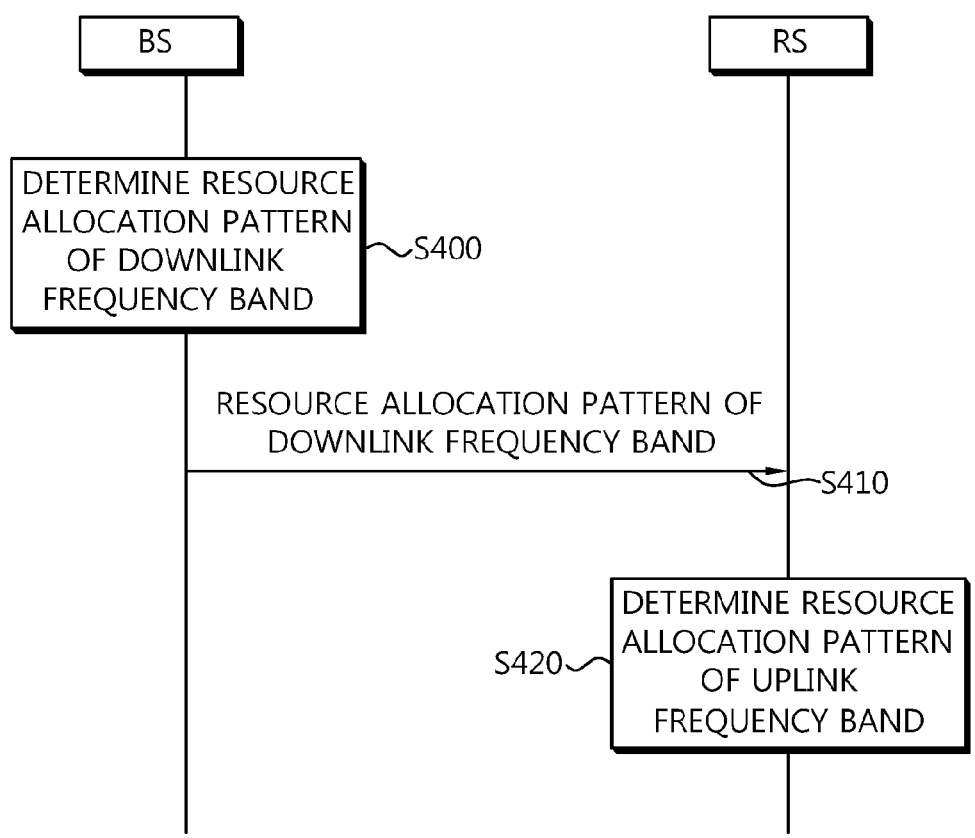
FIG. 15 is a flowchart showing a method of determining a resource allocation pattern according to another embodiment of the present invention.

FIG. 15 is a flowchart showing a method of determining a resource allocation pattern according to another embodiment of the present invention.

Referring to FIG. 15, a BS determines a resource allocation pattern for a backhaul link and an access link for a downlink frequency band (step S400). The downlink frequency band's resource allocation pattern determined in step S400 is transmitted to an RS (step S410). On the basis of the downlink frequency band's resource allocation pattern received in step S410, the RS determines a resource allocation pattern of an uplink frequency band. (step S420)

In FIG. 14 and FIG. 15, the resource allocation pattern of the downlink frequency band is first determined, and then the resource allocation pattern of the uplink frequency band is determined on the basis of the first determined resource allocation pattern. However, this is for exemplary purposes only, and thus the resource allocation pattern of the uplink frequency band can be first determined and then the resource allocation pattern of the downlink frequency band can be determined on the basis of the first determined resource allocation pattern.

Figure 16:
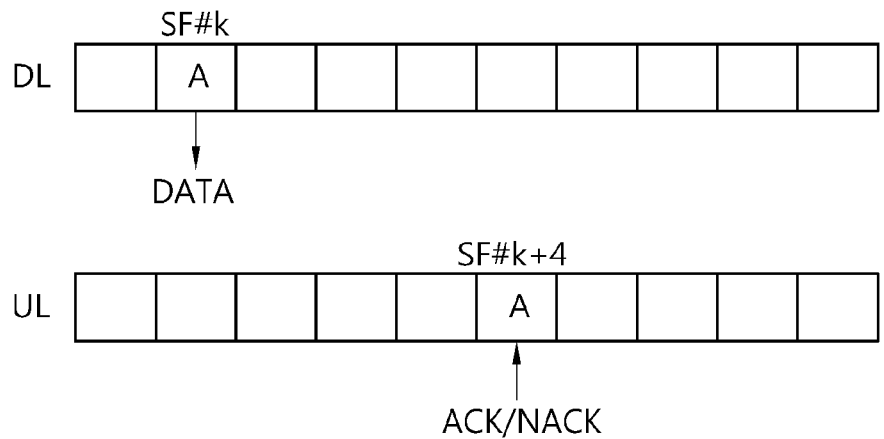
FIG. 16 shows an example of performing uplink hybrid automatic repeat request (HARQ) by using a method of determining a resource allocation pattern according to an embodiment of the present invention.

FIG. 16 shows an example of performing HARQ by using a method of determining a resource allocation pattern according to an embodiment of the present invention. When performing the HARQ, a transmitter Tx transmits data by using a subframe, and receives a feedback of acknowledgment (ACK)/not-acknowledgement (NACK) on the subframe from a receiver Rx, and then retransmits the data. A round trip time (RRT) is defined as a time from data transmission of the transmitter to data retransmission. According to an LTE specification, the receiver feeds back ACK/NACK after 4 subframes elapse from when the transmitter transmits data.

Referring to FIG. 16, a subframe #k of a downlink frequency band is determined as a subframe for an access link. Therefore, an RS can transmit downlink data to an MS through the subframe #k of the downlink frequency band. Upon receiving the downlink data from the RS, the MS feeds back ACK/NACK for the downlink data after a specific time elapses from when the downlink data is transmitted. For example, the MS feeds back ACK/NACK after 4 subframes elapse from when the downlink data is transmitted. Therefore, a subframe #k+4 of an uplink frequency band is determined as the subframe for the access link, and the MS feeds back ACK/NACK to the RS through the subframe #k+4.

Figure 17:
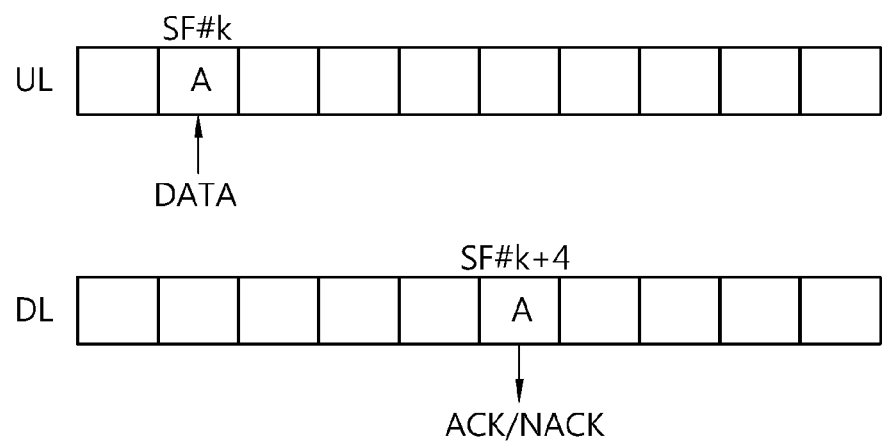
FIG. 17 shows another example of performing HARQ by using a method of determining a resource allocation pattern according to an embodiment of the present invention.

FIG. 17 shows another example of performing HARQ by using a method of determining a resource allocation pattern according to an embodiment of the present invention.

Referring to FIG. 17, a subframe #k of an uplink frequency band is determined as a subframe for an access link. Therefore, an MS can transmit uplink data to an RS through the subframe of the uplink frequency band. Upon receiving the uplink data from the MS, the RS feeds back ACK/NACK for the uplink data through a PHICH after a specific time (e.g., 4 subframes) elapses from when the uplink data is transmitted. Therefore, a subframe #k+4 of a downlink frequency band is determined as the subframe for the access link, and the RS feeds back ACK/NACK to the MS through the subframe #k+4 of the downlink frequency band.

As shown in FIG. 16 and FIG. 17, when considering HARQ, if a $k^{th}$ subframe of the downlink frequency band is determined as the subframe for the access link, a $(k+n)^{th}$ subframe (e.g., a (k+4)$^{th}$ subframe) of the uplink frequency band is also determined as the subframe for the access link. Alternatively, when a k$^{th}$ subframe of the uplink frequency band is determined as the subframe for the access link, a (k+n)$^{th}$ subframe of the downlink frequency band is also determined as the subframe for the access link. Likewise, when a k$^{th}$ subframe of the downlink frequency band is determines as a subframe for a backhaul link, a (k+n)$^{th}$ subframe (e.g., a (k+4)$^{th}$ subframe) of the uplink frequency band is also determined as the subframe from the backhaul link. Alternatively, when a k$^{th}$ subframe of the uplink frequency band is determined as a subframe for the backhaul link, a (k+n)$^{th}$ subframe of the downlink frequency band is also determined as the subframe for the backhaul link.

Hereinafter, a problem that may occur when a resource allocation pattern is determined based on the criterion 1 to the criterion 6 and a method of solving the problem will be described.

First, when a resource allocation pattern for a backhaul link and an access link is determined with a period of one frame (i.e., 10 ms), there may be a case where the criterion 6 cannot be satisfied at least once.

Figure 18:
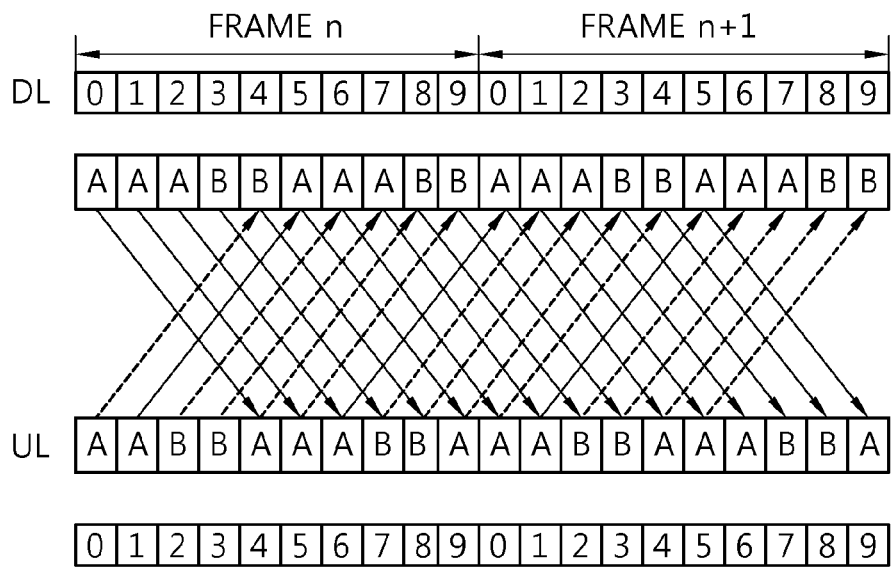
FIG. 18 and FIG. 19 show a resource allocation pattern allocated based on a criterion 1 to a criterion 6.
Figure 19:
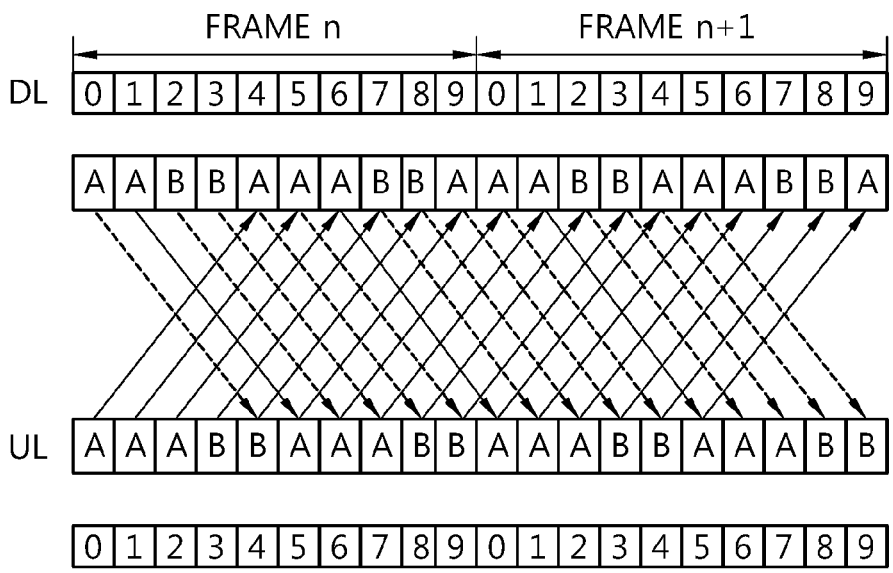

FIG. 18 and FIG. 19 show a resource allocation pattern allocated based on the criterion 1 to the criterion 6.

Referring to FIG. 18, a resource allocation pattern for a downlink frequency band is first determined, and a resource allocation pattern of an uplink frequency band is determined on the basis of the first determined resource allocation pattern. Herein, when an RS transmits downlink data to an MS through a subframe for an access link of the downlink frequency band, each MS can feed back ACK/NACK to the RS through a subframe for an access link of the uplink frequency band after 4 subframes elapse from when the downlink data is transmitted. Likewise, when the RS receives downlink data from a BS through a subframe for a backhaul link of the downlink frequency band, the RS can feed back ACK/NACK to the BS through a subframe for a backhaul link of the uplink frequency band after 4 subframes elapse from when the downlink data is transmitted.

However, when the resource allocation pattern of the uplink frequency band is determined based on the resource allocation pattern of the downlink frequency band as shown in FIG. 18, an error may occur in some subframes. For example, a subframe #0 of the uplink frequency band is determined as the subframe for the access link on the basis of a relation with the downlink frequency band. When the MS transmits uplink data to the RS through the subframe #0 of the uplink frequency band, the RS must feed back ACK/NACK to the MS through a subframe #4 of the downlink frequency band. However, since the subframe #4 of the downlink frequency band is determined as the subframe for the backhaul link, the RS cannot feed back ACK/NACK to the MS within a determined time.

Such an error may also occur in an opposite case. Referring to FIG. 19, a resource allocation pattern of the uplink frequency band is first determined, and a resource allocation pattern of the downlink frequency band is determined on the basis of the first resource allocation pattern. Herein, when an MS transmits uplink data to an RS through a subframe for an access link of the uplink frequency band, the RS can feed back ACK/NACK to the MS through a subframe for an access link of the downlink frequency band after 4 subframes elapse from when the uplink data is transmitted. Likewise, when the RS transmits uplink data to a BS through a subframe for a backhaul link of the uplink frequency band, the BS can feed back ACK/NACK to the RS through a subframe for the backhaul link of the downlink frequency band after 4 subframes elapse from when the uplink data is transmitted.

However, when the resource allocation pattern of the downlink frequency band is determined on the basis of the resource allocation pattern of the uplink frequency band as shown in FIG. 19, an error may occur in some subframes. For example, a subframe #0 of the downlink frequency band is determined as the subframe for the access link on the basis of a relation with the uplink frequency band. When the RS transmits downlink data to the MS through the subframe #0 of the downlink frequency band, the MS must feed back ACK/NACK to the RS through a subframe #4 of the uplink frequency band. However, the subframe #4 of the uplink frequency band is determined as the subframe for the backhaul link. Therefore, the RS cannot feed back ACK/NACK to the MS within a determined time. For another example, a subframe #2 of the downlink frequency band is determined as the subframe for the backhaul link on the basis of a relation with the uplink frequency band. When the BS transmits downlink data to the RS through a subframe #2 of the downlink frequency band, the RS must feed back ACK/NACK to the BS through a subframe #6 of the uplink frequency band. However, the subframe #6 of the uplink frequency band is determined as the subframe for the access link. Therefore, the BS cannot feed back ACK/NACK to the RS within a determined time.

Next, an error may also occur when the resource allocation pattern for the backhaul link and the access link is determined with a period corresponding to the least common multiple (i.e., 40 ms) of the number of HARQ channels and the number of subframes in one frame.

Figure 20:
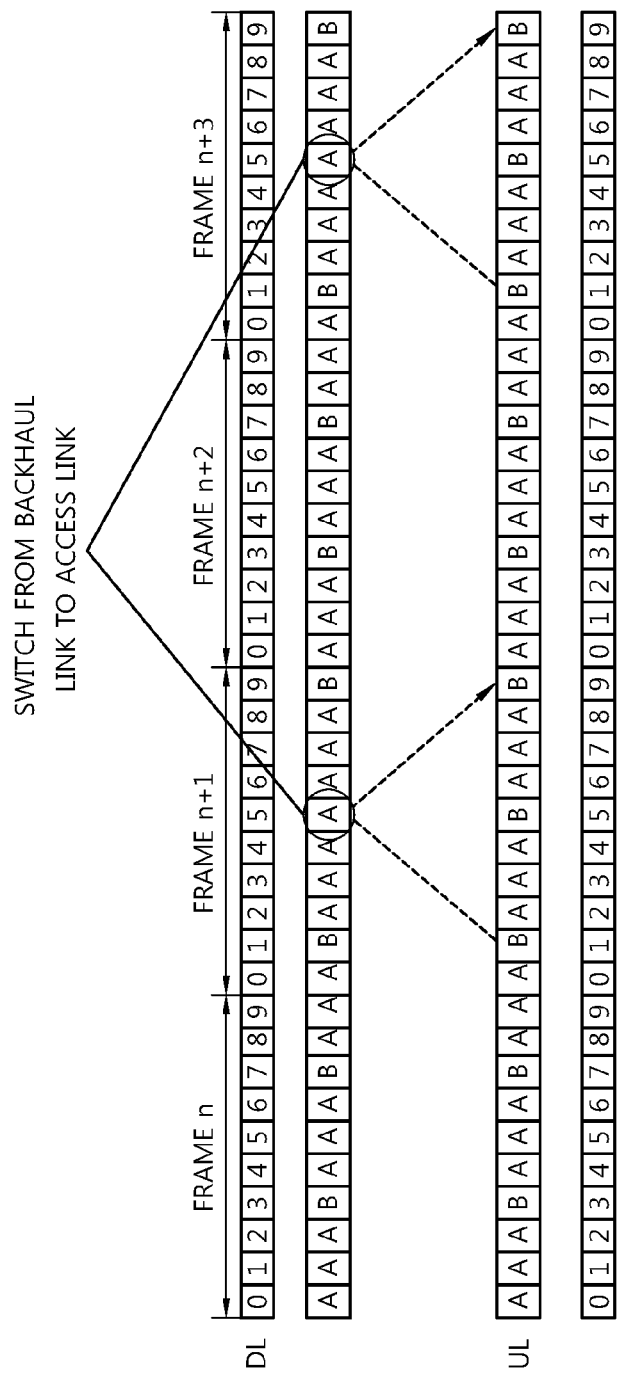
FIG. 20 shows a resource allocation pattern according to another embodiment of the present invention.

FIG. 20 shows a resource allocation pattern according to another embodiment of the present invention.

Referring to FIG. 20, the resource allocation pattern is determined with a period of 40 ms. A resource allocation pattern of either a downlink frequency band or an uplink frequency band is first determined, and then a resource allocation pattern of the remaining frequency band is determined on the basis of the first determined resource allocation pattern. Herein, since a period of the resource allocation pattern is 40 ms and an HARQ operation of 8 channels is considered, an error occurrence probability of FIG. 18 and FIG. 19 is relatively low. However, since at least one pair of subframes spaced apart by 5 subframes must be configured as a subframe for an access link in the downlink frequency band as in the criterion 2, an error may occur. For example, a subframe #0 and a subframe #5 of the downlink frequency band must be configured as the access link for transmission of a synchronization signal. Therefore, an error may occur in a resource allocation pattern of the uplink frequency band corresponding thereto.

Hereinafter, a method of solving the aforementioned problem will be described.

Figure 21:
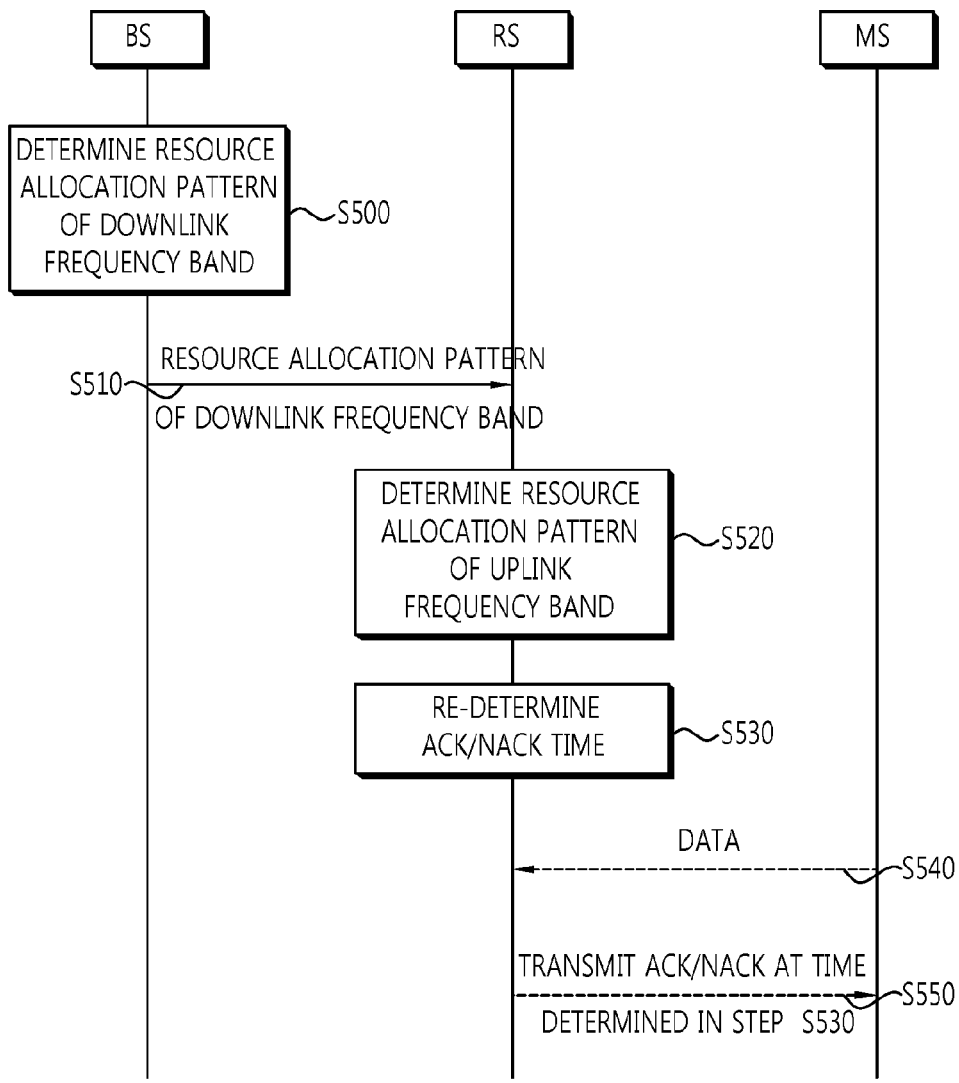
FIG. 21 is a flowchart showing a resource allocation method according to an embodiment of the present invention.

FIG. 21 is a flowchart showing a resource allocation method according to an embodiment of the present invention. Although an HARQ operation in an access link between an RS and an MS is described herein for example, the present invention can also apply to an HARQ operation in a backhaul link between a BS and the RS.

Referring to FIG. 21, the BS determines a resource allocation pattern of a downlink frequency band (step S500). The BS transmits information on the downlink frequency band's resource allocation pattern determined in step 500 to the RS (step S510). The RS determines a resource allocation pattern of an uplink frequency band on the basis of the information which is received in step 510 and which regards to the resource allocation pattern of the downlink frequency band (step S520). On the basis of the resource allocation pattern of the downlink frequency band and the resource allocation pattern of the uplink frequency band, the RS re-determines HARQ timing (step S530). Herein, the HARQ timing may imply a duration from an initial data transmission time to an ACK/NACK feedback time. When the RS receives data from the MS (step S540), ACK/NACK is fed back to the MS in accordance with the HARQ timing determined in step S530 (step S550).

For example, in FIG. 18, if the MS transmits uplink data to the RS in a subframe #0 of an uplink frequency band, the RS cannot feed back ACK/NACK to the MS in a subframe #4 of a downlink frequency band. This is because the subframe #4 of the downlink frequency band is determined to a subframe for a backhaul link. In this case, the RS can feed back ACK/NACK through a PHICH at a time delayed by one subframe from a pre-defined time by using the HARQ timing re-determined in step S530. Referring to FIG. 18, ACK/NACK for data transmitted from the MS to the RS in a subframe #1 of the uplink frequency band is determined to be transmitted in a subframe #5 of the downlink frequency band. In this case, ACK/NACK for data transmitted in the subframe #0 of the uplink frequency band and ACK/NACK for data transmitted in the subframe #1 of the uplink frequency band can be transmitted in the subframe #5 of the downlink frequency band by being multiplexed using at least one of time, frequency, and code.

Herein, the RS may report information on the resource allocation pattern of the uplink frequency band, the resource allocation pattern of the downlink frequency band, and the re-determined HARQ timing to the MS. Accordingly, the MS can know a reception time of ACK/NACK.

Figure 22:
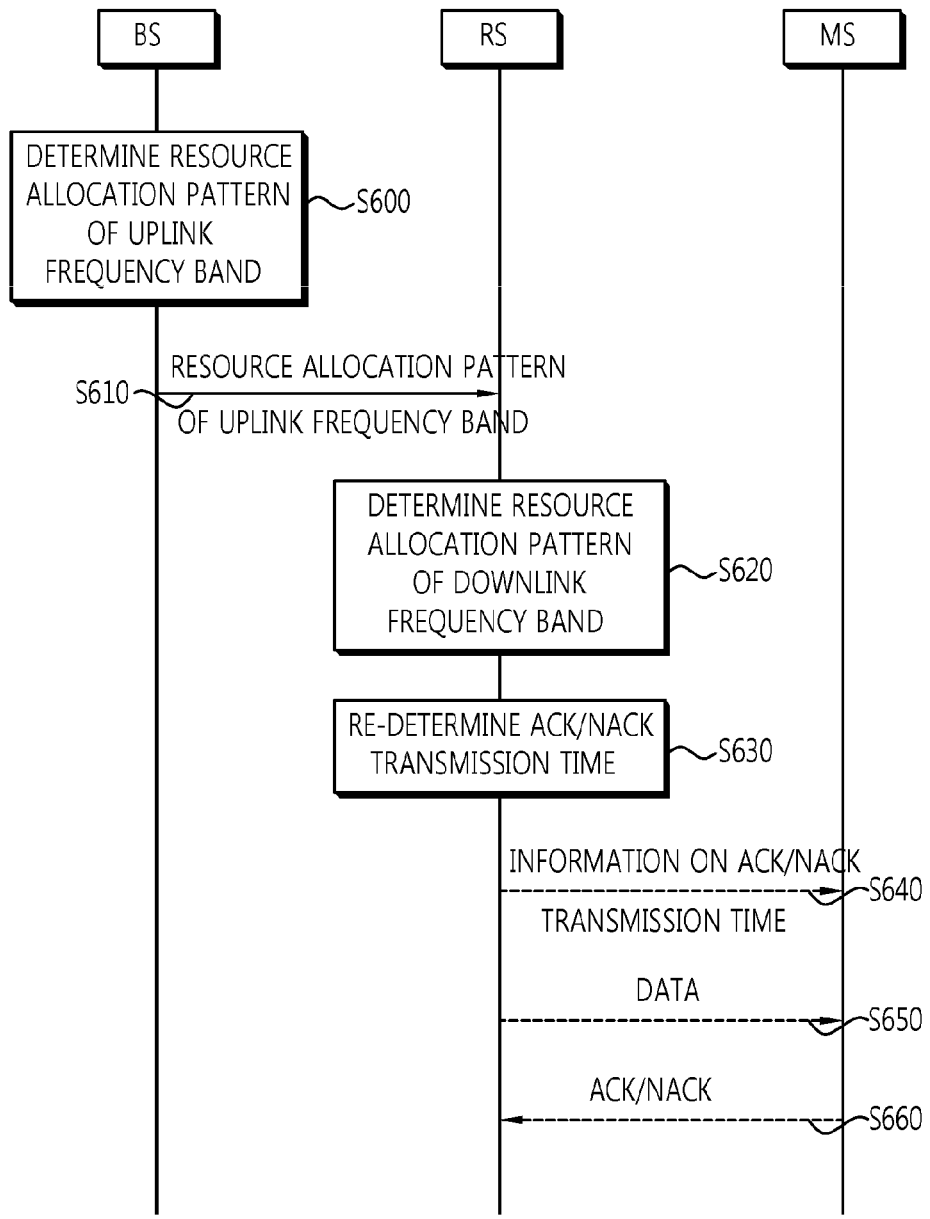
FIG. 22 is a flowchart showing a resource allocation method according to anther embodiment of the present invention.

FIG. 22 is a flowchart showing a resource allocation method according to anther embodiment of the present invention. Although an HARQ operation in an access link between an RS and an MS is described for example in the present embodiment, the present invention can also apply to an HARQ operation in a backhaul link between a BS and the MS.

Referring to FIG. 22, the BS determines a resource allocation pattern of an uplink frequency band (step S600). The BS transmits information on the uplink frequency band's resource allocation pattern determined in step 600 to the RS (step S610). The RS determines a resource allocation pattern of a downlink frequency band on the basis of the information which is received in step 610 and which regards to the resource allocation pattern of the uplink frequency band (step S620). On the basis of the resource allocation pattern of the uplink frequency band and the resource allocation pattern of the downlink frequency band, the RS re-determines an ACK/NACK transmission time (step S630), and reports information on the ACK/NACK transmission time to the MS (step S640). Herein, the ACK/NACK transmission time may be a subframe allocated for the access link before or after 4 subframes from a data transmission time. The RS can report information on the ACK/NACK transmission time to the MS through a PDCCH or a medium access control (MAC) protocol data unit (PDU). Therefore, when the RS transmits downlink data to the MS (step S650), the RS receives ACK/NACK from the MS in accordance with the ACK/NACK transmission time determined in step S640 (step S660).

For example, in FIG. 19, if the RS transmits downlink data to the MS in a subframe #0 of a downlink frequency band, the MS cannot feed back ACK/NACK to the RS in a subframe #4 of an uplink frequency band. This is because the subframe #4 of the uplink frequency band is determined to a subframe for the backhaul link. In this case, the MS can feed back ACK/NACK through a PUCCH at a time delayed by one subframe from a pre-defined time by using the ACK/NACK transmission time received in step S640.

As such, ACK/NACK for data transmission indicated by a dotted line in FIG. 18 and FIG. 19 can be determined to be fed back through a subframe in which ACK/NACK can be transmitted among subframes before or after a corresponding subframe. In addition, in FIG. 20, a subframe #5 of an odd frame or an even frame can be determined as the subframe for the backhaul link. Accordingly, an MS coupled to the RS in the odd frame or the even frame may be restricted in receiving a synchronization signal from the RS, but an error in an HARQ process can be avoided. Further, when information indicating that the synchronization signal cannot be received in a specific frame is signaled to the MS coupled to the RS, a problem caused by non-transmission of the synchronization signal can be avoided.

Figure 23:
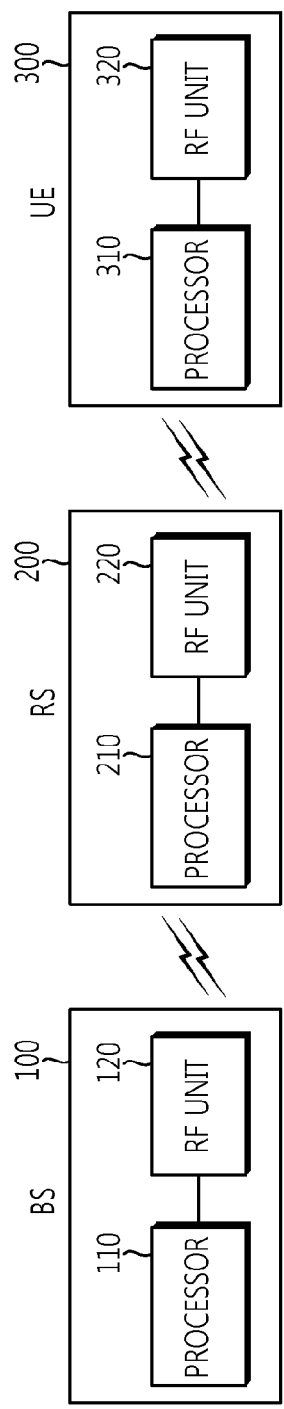
FIG. 23 is a block diagram showing a wireless communication system employing a relay station according to an embodiment of the present invention.

FIG. 23 is a block diagram showing a wireless communication system employing an RS according to an embodiment of the present invention.

Referring to FIG. 23, the wireless communication system includes a BS 100, an RS 200, and a UE 300. The BS 100 includes a processor 110 and a radio frequency (RF) unit 120. The RF unit 120 of the BS transmits and receives a radio signal. The processor 110 determines a resource allocation pattern of an uplink frequency band and/or a resource allocation pattern of a downlink frequency band, and transmits information on the resource allocation pattern of the uplink frequency band and/or the resource allocation pattern of the downlink frequency band to the RS 200. The RS 200 includes an RF unit 220 and a processor 210. The RF unit 220 of the RS 200 transmits and receives a radio signal. The processor 210 receives information on at least one of the resource allocation pattern of the uplink frequency band and the resource allocation pattern of the downlink frequency band from the BS, and determines the remaining resource allocation patterns on the basis of the information. The UE 300 includes an RF unit 320 and a processor 310. The RF unit 320 of the UE 300 transmits and receives a radio signal. The processor 310 of the UE 300 receives information on the resource allocation pattern of the uplink frequency band and/or the resource allocation pattern of the downlink frequency band from the RS, and communicates with the RS.

The present invention can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present invention can be implemented with a module for performing the aforementioned functions. Software is storable in a memory unit and executed by the processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of communicating in a wireless communication system, performed by a relay station (RS), the method comprising:
receiving configuration information from a base station (BS), the configuration information indicating at least one backhaul link subframe among a fixed number of subframes in a time domain, wherein the at least one backhaul link subframe can be used for transmission from the BS to the RS;
configuring at least one subframe based on the configuration information; and receiving a signal from the BS by using the at least one configured subframe,
wherein the at least one configured subframe is selected among the at least one backhaul link subframe with an exception that predefined subframes of a radio frame are excluded,
wherein when the radio flame includes ten subframes, the predefined subframes are a first, a fifth, a sixth and a tenth subframe of the radio flame when the BS and the RS are operated in frequency division duplex (FDD).

2. The method of claim 1, further comprising: connecting with a user equipment (UE); and
transmitting a signal to the UE in the first, the fifth, the sixth and the tenth subframes.

3. The method of claim 1, wherein when the radio frame includes ten subframes, the predefined subframes comprise a first, a second, a sixth and a seventh subframe of the radio frame when the BS and the RS are operated in time division duplex (TDD).

4. The method of claim 3, further comprising:
connecting with a user equipment (UE); and
transmitting a signal to the UE in the first, the second, the sixth and the seventh subframes.

5. The method of claim 1, wherein the fixed number of subframes is 8 subframes.

6. The method of claim 1, wherein the configuration information is received via a higher layer signal.

7. The method of claim 1, wherein the fixed number of subframes is related to a hybrid automatic repeat request (HARQ) round trip time (RTT).

8. The method of claim 1, wherein the configuration information includes a bitmap which indicates the at least one backhaul link subframe.

9. The method of claim 8, wherein the bitmap comprises 8 bits.

10. A relay station (RS) comprising:
a processor; and
a radio frequency (RF) unit, coupled to the processor, for transmitting and receiving a radio signal,
wherein the processor receives configuration information from a base station (BS), the configuration information indicating at least one backhaul link subframe among a fixed number of subframes in a time domain, wherein the at least one backhaul link subframe can be used for transmission from the BS to the RS,
configures at least one subframe based on the configuration information, and
receives a signal from the BS by using the at least one configured subframe,
wherein the at least one configured subframe is selected among the at least one backhaul link subframe with an exception that predefined subframes of a radio frame are excluded,
wherein when the radio frame includes ten subframes, the predefined subframes are a first, a fifth, a sixth and a tenth subframe of the radio frame when the BS and the RS are operated in frequency division duplex (FDD).

11. The RS of claim 10, wherein the processor transmits a signal to the UE in the first, the fifth, the sixth and the tenth subframes.

12. The RS of claim 10, wherein when the radio frame includes ten subframes, the predefined subframes comprise a first, a second, a sixth and a seventh subframe of the radio frame when the BS and the RS are operated in time division duplex (TDD).

13. The RS of claim 12, wherein the processor transmits a signal to the UE in the first, the second, the sixth and the seventh subframes.

14. The RS of claim 10, wherein the fixed number of subframes is 8 subframes.

15. The RS of claim 10, wherein the configuration information is received via a higher layer signal.

16. The RS of claim 10, wherein the fixed number of subframes is related to a hybrid automatic repeat request (HARQ) round trip time (RTT).

17. The RS of claim 10, wherein the configuration information includes a bitmap which indicates the at least one backhaul link subframe.

18. The RS of claim 17, wherein the bitmap comprises 8 bits.

* * * * *